March 8, 1966 G. FONDA-BONARDI 3,239,250
COUPLING FOR HOLLOW STRUCTURES
Filed Oct. 1, 1962
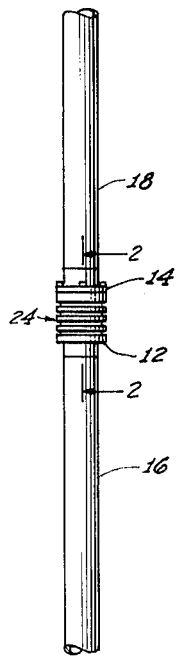
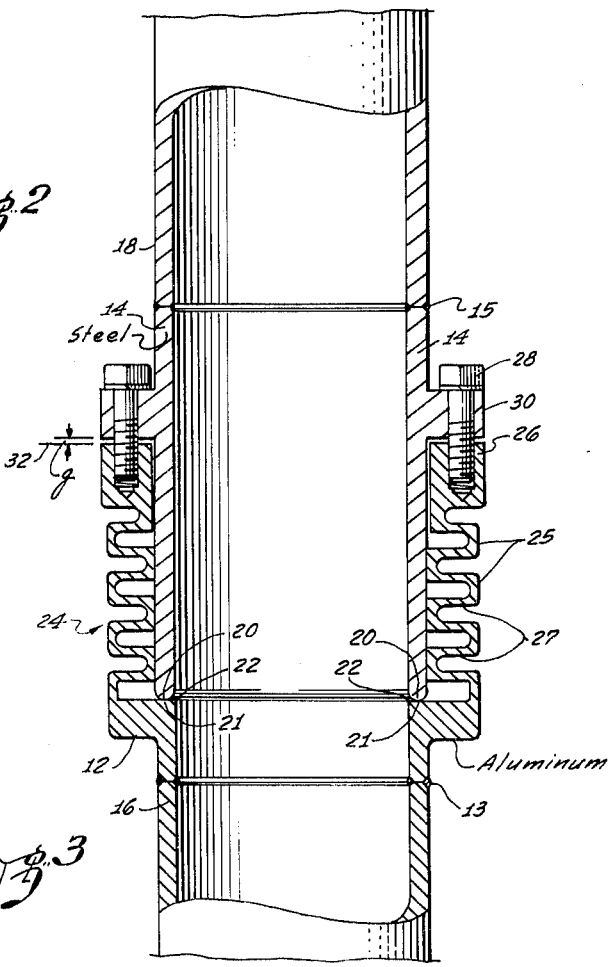
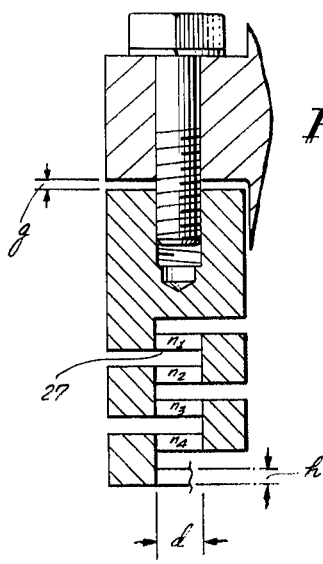
INVENTOR:
Guisto Fonda-Bonardi
By Alan C. Rose
Attorney United States Patent Office 3,239,250
Patented Mar. 8, 1966

3,239,250
COUPLING FOR HOLLOW STRUCTURES
Giusto Fonda-Bonardi, Los Angeles, Calif., assignor to Litton Systems, Inc., Beverly Hills, Calif., a corporation of Maryland
Filed Oct. 1, 1962, Ser. No. 227,362
6 Claims. (Cl. 285—187)

This invention generally relates to a vacuum and fluid-tight seal for joining fluid carrying members, and more particularly to a temperature compensated seal for preventing leakage from the seal into a vacuum surrounding the joint at the ambient temperature, cryogenic temperatures, and the temperature range in between. Ambient refers to the surrounding air temperature, and cryogenic refers to very low temperatures near absolute zero.

Vacuum systems and hydraulic fluid systems have various pipes, valves, storage tanks and other system components. It is desirable to be able to couple these various components together by means of leak-tight couplings which should be compact, reuseable, light-weight, simply constructed and useable in dimensions suitable for pipes of widely differing diameters.

At the ambient temperature design of a coupling and seal is relatively simple. The seal usually utilizes a pair of sealing surfaces and a deformable gasket clamped between them. Such gaskets may be rubber, Teflon, or even soft metals. Suitable mechanical arrangements are used to tighten the sealing surfaces and compress the deformable gasket to effect a leak-tight seal.

However, when it becomes desirable to transmit low temperature fluids and to maintain a leak-proof vacuum connection at cryogenic temperatures after an initial sealing adjustment at the ambient temperature, problems arise.

Typically, the seal is adjusted to be leak tight at the ambient, then the seal is brought down to cryogenic temperatures. At cryogenic temperatures leakage difficulties frequently appear. Materials of the seals undergo changes at extremely low temperatures. Rubber, for example, becomes brittle. Different thermal expansion coefficients and rates of contraction of the sealing surfaces, pipes, gaskets, and the connecting means have a tendency to make sealing surfaces separate and allow leakage of pressurized fluids.

The problem is especially critical when it is desired to join two fluid-carrying bodies of dissimilar metals, such as aluminum and steel, which have highly different coefficients of expansion. The difference in contraction may cause a seal which is tight at the ambient temperature to open at extremely low temperatures. Adding a deformable gasket merely complicates the problem, as it has a still different coefficient of expansion and low temperature mechanical properties which must be taken into consideration.

It would be relatively simple to design a joint which seals tight at either the ambient or extremely cold temperatures, but the design of a simple and compact seal which will be leak tight at both the ambient and low temperatures, as well as throughout the intermediate range, presents a more formidable problem. Such seals must be reuseable, easily assembled and disassembled, and yet a leak-tight seal must be consistently obtained by unskilled personnel.

Furthermore, in many cases, it is desirable to have a fluid carrying member surrounded by a very high vacuum which must not be contaminated. For example, it may be desired to transmit liquid oxygen (−183.0° C.) by means of a fluid carrying member passing through a high vacuum environment. Microscopic leakage into the vacuum, measurable by only mass spectrometer techniques, may be sufficient to contaminate the vacuum. The requirements of a seal to prevent vacuum contaminating leakage are much more stringent, by many orders of magnitude, than those required of a seal which must be merely fluid tight or leak tight. The problem of devising such a seal becomes immeasurably harder when it is to be subjected to temperature changes ranging from the ambient to cryogenic temperatures.

Accordingly, it is a general object of this invention to provide a vacuum and fluid-tight seal for preventing leakage of pressurized fluid. Such a seal should seal a hydraulic or vacuum coupling at both the ambient and extremely cold temperatures as well as throughout the intermediate temperature range. Such a seal should be capable of protecting a vacuum from contamination by leakage from a fluid carrying element passing through it.

Another object involves a device for effecting a compact fluid-tight seal between low temperature fluid or vacuum carrying members which will be leak tight in the range between the ambient and extremely low temperatures without use of gaskets or separate sealing parts.

A further object is to make a seal as described in the objects above which may readily be assembled and disassembled at normal ambient temperatures.

A further object involves the design of a coupling between an aluminum fluid or vacuum carrying element and a steel fluid or vacuum carrying element. Such a coupling should utilize no separate gaskets or connecting means; should be fluid tight in the temperature range between the ambient and extremely low temperatures; and should be readily assembled and disassembled at the ambient.

In accordance with one illustrative embodiment of the invention, an annular sealing surface is provided on the aluminum member of the elements to be coupled, and a sealing rim is provided on the steel member to press against the aluminum surface. The aluminum sealing surface is soft enough to plastically flow like clay and seal around the edges of the steel rim when sufficient pressure is applied to force the surface and rim together. The difference between the coefficient of expansion of aluminum and steel is utilized to make the contraction of the aluminum press the surface and rim into closer contact as the temperature decreases. Means are provided for insuring that the contraction will not deform the aluminum element beyond its elastic limit except at the mating surfaces. As long as the elastic limit is not exceeded, the metal will spring back to its original shape without permanent deformation when the pressure is released.

An important feature of this invention involves the use of a relatively soft metal possessing a relatively high coefficient of expansion in conjunction with a harder metal possessing a much lower coefficient of expansion to form a seal and joint which may be sealed at the ambient temperature and remain leak tight at the ambient and cryogenic temperatures as well as throughout the temperature range in between. The seal and joint are designed to be reuseable and easily assembled and disassembled at normal ambient temperatures.

The novel features which are believed to be characteristic of the invention both as to its organization and method of construction and operation, together with further objects and advantages thereof, will be better understood from the following description considered in connection with the accompanying drawing in which illustrative embodiments of the invention are disclosed by way of example. It is to be expressly understood that the drawing is for the purposes of illustration and description only and does not constitute a limitation of the invention.

In the drawing:

FIG. 1 is a view of a typical part of a hydraulic or vacuum system comprising an aluminum pipe and a steel pipe joined by a leak-proof coupling;

FIG. 2 is a side elevational view, in section, illustrating one preferred coupling and seal in assembled relation; and FIG. 3 is an enlarged partial cross sectional view in schematic form of the bellows-like portion of the coupling in FIG. 2 for the purpose of illustrating the calculations employed in designing the bellows.

Referring more particularly to the drawings, FIGS. 1 and 2 show, by way of example, a coupling unit with a relatively soft aluminum member 12 welded at 13 to an aluminum pipe 16 and a relatively hard steel member 14 welded at 15 to a steel pipe 18. The steel member can be inserted in the aluminum member and terminates in a rounded rim 20. This rim is pressed into sealing relationship with the surface 21 of a shoulder 22 inside the aluminum member. This surface is perpendicular to the cylindrical axis of the member. The aluminum member extends axially from said deformable shoulder in a bellows-shaped sheath 24 overlapping and enclosing the inserted steel member. This sheath is composed of convolutions 25 made up of axially-spaced annular webs 27 perpendicularly disposed to the axis of the pipe members, and has a cross sectional length greater than its axial length. Each annular web is joined at its inner rim to the inner rim of the web on one side and at its outer rim to the outer rim of the web on the other side so as to form a leak-tight bellows 24. In practice the bellows-like structure may be machined out of solid stock. However, the annular web concept is useful in understanding the bellows design equations discussed below.

This bellows-shaped sheath terminates in a flange 26 which is attached by radially-spaced threaded bolts 28 to an annular shoulder 30 on the steel insert. These bolts provide clamping force to press the rim 20 and surface 21 into sealing relationship. The distance from the steel insert shoulder to the steel rim edge is longer than the distance from the deformable shoulder of the aluminum sheath to the flange at the end of the bellows. Therefore, when the bellows flange is drawn toward the shoulder of the steel insert, a gap 32 remains between the shoulder and the flange. This gap is adjustable; by inserting a feeler gauge of specified thickness, the gap 32 can be closed by tightening the bolts to expand the bellows until a predetermined pressure between the rim 20 and surface 21 of the seal is accurately obtained.

This pressure should be sufficient to cause a small plastic flow of the aluminum surface around the steel rim along with some elastic deformation of the other portions of the aluminum bellows member. This plastic flow of the sealing surfaces is microscopic in nature and makes the seal impervious to vacuum contaminating leakages of a measurable magnitude when mass spectrometer measuring devices are used. If it were not for this plastic flow, machining limitations would make it almost impossible to make a seal which is impervious to leakages of this magnitude.

Machining limitations make it very difficult to make a pair of sealing surfaces which mate exactly. There will always be microscopic burrs and hollows which prevent the surfaces from mating perfectly. In order to overcome this limitation and make the surfaces mate perfectly, the surfaces are pressed together and sufficient force applied to make the surfaces plastically flow. This mates each surface to the minor imperfections on the opposite surface and forms a near-perfect seal.

Although such plastic deformation is permanent, it does not prevent the surfaces from being used in a reuseable seal. As long as sufficient force is applied to plastically flow the surfaces, the surfaces mate anew each time a connection is made. It should be noted that a given force can produce a plastic deformation at a sealing surface and only produce elastic deformation at other portions of the member containing the surface. This will occur if the member is subjected to a force which provides insufficient pressure over most of its cross sectional area to cause plastic deformation. The plastic deformation will occur at the burrs and imperfections between the mating surfaces, because here this same force is exerted on the very small pointal areas of the burrs. The same force, which will produce only a nominal pressure on a larger area, will produce a very high pressure on a pointal area. This extremely high pressure will cause one surface to flow around the burrs of the other surface with the resultant close mating between surfaces. This gives, in effect, a microscopic O-ring type seal similar to that produced by a deformable gasket of Teflon or rubber. When the pressure is properly adjusted, the seal will give a leak-tight connection at the ambient temperature.

When the temperature is decreased to extremely low values by the passage of liquid air or some other very cold fluid in the 4° Kelvin range, the steel insert and the aluminum sheath contract. Since aluminum has a much higher coefficient of expansion than steel, it contracts much more and serves to increase the pressure between the steel rim and the deformable aluminum surface of the seal. Thus, the seal tightens at cryogenic temperatures instead of loosening as would be the tendency in an ordinary seal.

In order for the seal to be effective, the pressure must be great enough at the ambient for plastic flow of the aluminum surface to occur. On the other hand, it is important that the pressure not be so great that the contraction of the aluminum at cryogenic temperatures will increase the pressure to the point where the deformation of the aluminum bellows and other portions of the integral aluminum member and metal adjacent the surface is no longer elastic. If the pressure is increased beyond this point, permanent deformation of these other areas of the aluminum will occur. This is undesirable in a seal which is intended to be reuseable as well as quickly and easily assembled and disassembled.

It can be seen from the drawings that when the gap 32 is closed, a tensile force is applied to the aluminum bellows-shaped sheath 24 which results in pressure being applied to the sealing surfaces which are the rim 20 and the surface 21. As a result of this tensile force, there is a plastic flow of the aluminum sealing surface 21 around the rim 20 of the steel insert. Another effect is an elastic axial elongation of the aluminum bellows sheath 24. In the elastic region, the elongation of the sheath is directly proportional to the pressure applied to the sealing surfaces. If this elongation were of an easily measurable magnitude, then it would serve as a convenient indicator of the exact pressure applied at the sealing surfaces.

A large elastic elongation would also make it practical to employ fine adjustment elements for precisely setting the sealing surface pressure, e.g. the range between no pressure and maximum pressure could require 10 turns of an adjustment screw instead of ¼ turn.

Unfortunately, a solid aluminum sheath of practical dimensions for many applications would not have an elastic elongation range of sufficient magnitude to get the above described advantages. With a solid aluminum sheath, the axial elastic elongation of the sheath related to the desired surface pressures at the ambient would be extremely small. It would be almost impossible to accurately determine the amount of pressure between the sealing surfaces. As a result, it would be a formidable problem to determine whether or not sufficient margin remained so as to allow contraction of the sheath at cryogenic temperatures without causing permanent deformation.

The unique sheath with a bellows cross section makes it possible to realize these advantages. Such a sheath greatly increases the magnitude of the axial elastic deformation for a sheath of given dimensions in comparison to the elastic deformation of an equivalent solid sheath for the same applied force. A bellows-type sheath undergoes flexure as well as elongation, and as a result has a much greater amount of movement for a given force than a solid sheath. As a result the increment of axial movement per increment of rim to surface pressure is enlarged in comparison to the movement-pressure ratio inherent in a solid member.

With a bellows-type sheath, it is possible to get a sheath elongation of easily measurable magnitude before the elastic limit of the aluminum is exceeded. In such a sheath the position of the flange serves as an accurate indicator of the pressure applied to the sealing surfaces. Suitable adjusting devices can be provided for setting the flange in a position related to the precise sealing surface pressure desired. Thus, it is possible to calculate the elongation equivalent to the maximum allowable deformation before the elastic limit of the sheath is exceeded. An arrangement may then be made to prevent the sheath from being elongated more than this amount. In the preferred embodiment shown in the drawings, the annular shoulder 30 on the steel member 14 performs this function by acting as a stop.

When the seal is subjected to cryogenic temperatures, the difference in contraction due to the different thermal expansion coefficients of the aluminum 12 and steel 14 members will cause additional elongation. Therefore, the stop arrangement must be designed so as to limit the permissible elongation at the ambient to an amount equal to the difference between the cryogenic deformation and the maximum allowable deformation.

In the preferred embodiment of the invention, the gap 32 between the flange 26 of the aluminum bellows sheath 24 in its relaxed position and the annular shoulder 30 of the steel insert is designed to have a width at the ambient equal to the difference between the maximum allowable deformation of the sheath and the difference in contraction between the sheath and the steel insert at cryogenic temperatures. Feeler gauges may be inserted in the gap, and the flange and shoulder closed on the gauge to get any desired setting. Proper design of the bellows and the adjusting bolts 28 will give any desired precision in controlling the setting of the pressure applied to the sealing surfaces.

The design of the bellows and the gap width is very important as improper design may result in permanent deformation of the aluminum member by either contraction at cold temperatures or excessive closure of the flange gap, or both. The gap is designed so that complete closure at the ambient will still allow enough elasticity to prevent permanent deformation, except at the mating surface, when the seal is brought down to cryogenic temperatures.

The design of the bellows is based on a cantilever formula adapted to a bellows configuration. The bellows can be considered to be comprised of axially spaced webs joined by convolutions. Each web undergoes flexure when the bellows is subjected to an expansive force. Each web can be subjected to a maximum flexure before it reaches a point where it will undergo permanent deformation. Up to this point the flexure of each web will be elastic. The total elastic flexure of the bellows will be the sum of the flexure of the individual webs.

Referring to FIG. 3, the flexure of each web is a function of the dimensions of the web and is independent of the diameter of the seal. If the cross-sectional dimensions of the webs are made constant for all diameters of seal, a bellows with a constant number of webs will have the same elastic deformation for all diameters of seal.

The general formula for calculating the flexure of a single web is:

$$f = \frac{Wd^3}{Eh^3} \quad (1)$$

where:

$W$ = stress in pounds per transverse inch
$E$ = modulus of elasticity
$d$ = distance between inner and outer connection of each web
$h$ = thickness of each web The total flexure for a bellows will be proportional to the number of webs $n$. Therefore, Formula 1 becomes:

$$f = n\frac{Wd^3}{Eh^3} \quad (2)$$

For one specific aluminum test model having seven webs in the bellows structure, the values are:

$E$ = modulus of elasticity = $10^7$ p.s.i. for aluminum
$d$ = 0.250 inch
$h$ = 0.062 inch
$n$ = 7 webs These values are inserted in Formula 2 and the value of $f$ for these values is found to be:

$$f = 0.000045W \quad (3)$$

In order to calculate the maximum flexure allowable before the elastic limit is exceeded and the part becomes permanently deformed, the safe load stress $W_s$ is calculated and inserted in the above formula. $W_s$ is calculated in accordance with the following formula:

$$W_s = h^2 S/3d \quad (4)$$

where S is the yield strength of the metal.
For the test model:

$$S = \text{yield strength} = 8 \times 10^4 \text{ p.s.i. for aluminum} \quad (5)$$

The other values remain the same.

$$W_s = h^2 S/3d = 420 \text{ lbs. per inch of transverse length} \quad (6)$$

This value is inserted in Formula 3 derived above:

$$f = 0.000045 W_s = 0.0185 \text{ inch} \quad (7)$$

This is the maximum flexure of the bellows before the elastic limit is exceeded and the part deformed. If the bellows were flexed this amount at the ambient, then the additional flexure due to contraction at cryogenic temperatures would permanently deform the member. Therefore, the flexure at cryogenic temperatures due to the difference in thermal contraction of the steel and the aluminum must be calculated. This value is then subtracted from the maximum flexure allowable to give the maximum allowable flexure at the ambient. The gap between the flange of the aluminum bellows and the shoulder of the steel insert can then be made equal to this flexure. With this design complete closure of the gap at the ambient will not exceed the metal's elastic limit and cause permanent deformation of the member at cryogenic temperatures, except at the sealing surfaces.

The respective thermal expansion coefficients are:

| | |
|---|---|
| Aluminum | 13.3 in./in. $\times 10^{-6}$/° F. |
| Steel | 7.3 in./in. $\times 10^{-6}$/° F. |
| The difference is | 6.0 in./in. $\times 10^{-6}$/° F. |

Assuming that the seal is to operate in the range 80° F. to −420° F., there is a temperature difference of 500° F. The length of the bellows used is 2 inches.

Contraction due to the difference in expansion coefficient = $b$.

$b$ = 6 in./in. $\times$ 2 inch $\times$ 500° F.

$$\times 10^{-6}/° \text{ F.} = 0.0060 \text{ inch} \quad (8)$$

The total allowable flexure (calculated above 0.0185 inch) is to be distributed between the flexure due to contraction $b$ and the preset allowable flexure at the ambient determined by the gap. The amount of allowable flexure at the ambient for the gap is $g$.

$$g = 0.0185 - b = 0.0185 - 0.0060 = 0.0125 \text{ inch} \quad (9)$$

If the gap between the steel shoulder and the bellows flange is more than 0.0125 inch, then closing the gap will expand the bellows more than 0.0125 inch and permanent deformation of the bellows can occur. Therefore, the gap width is limited to 0.0125 at the ambient with the bellows in the unstretched position. This gap width prevents the bellows from being stretched enough to cause permanent deformation and yet allows maximum sealing pressure. In practice it is found that the seal works perfectly when the bellows is stretched only 0.0115 inch, leaving a gap of 0.001 inch remaining of the original 0.0125 inch gap. This gives a safety margin to insure the absence of permanent bellows deformation.

Because there is no permanent deformation, except at the sealing surfaces, the members return to normal shape when the ambient temperature replaces the extremely cold temperatures and the sealing pressure returns to the preset value. The coupling may then be separated if desired. It is then possible to recouple the elements, and again preset the pressure by feeler gauge. The coupling will again be vacuum tight throughout the range from the ambient to cryogenic temperatures in the 4° to 80° Kelvin range.

A very practical and novel feature of this invention is that it can be adapted to any size seal without further calculations. All dimensions and forces are calculated on a circumferential inch basis. The bellows dimensions are totally independent of the seal diameter, and the number of adjustable bolts necessary to hold the sheath to the flange is found by multiplying the flange circumference of the seal desired by the number of bolts per circumferential inch initially calculated.

Excellent results have been obtained in tests made on a test model. The end of the aluminum bellows member was sealed and the joint assembled. It was placed in a vacuum chamber with the pipe welded to the steel insert leading outside the chamber through its top. Liquid nitrogen (−195.8° C.) was poured in the pipe so that it filled the joint. The vacuum chamber interior was pulled down to a vacuum to produce a pressure differential of one atmosphere across the seal, and a mass spectrometer used to check for leakage of the nitrogen into the chamber. The pressure on the sealing surfaces was properly adjusted by stretching the bellows the proper distance, as set by a feeler gauge inserted between the bellows flange and the steel insert shoulder. A gap of 0.001 inch was left after tightening. In a series of tests at room temperature and at liquid nitrogen temperature, the joint showed zero leakage on the mass spectrometer. The joint was taken apart and reassembled. The result was zero leakage after again being subjected to the tests. The joint was then set loosely at the ambient temperature so that it measured a slight leak. The temperature was taken down to liquid nitrogen temperature and the leak stopped. This confirmed the design theory that chilling the joint would make the seal tighter. Except for the plastic flow at the sealing surfaces, no permanent deformation of either element of the joint could be discovered.

A number of seals of different diameters have been successfully constructed, with the same cross-sectional web configuration employed in each case. These seals ranged from 1 to 19 inches in diameter, and were all adjustable to the same flange spacing.

Since this invention takes advantage of the plastic and elastic deformability of the more deformable metals, and also takes advantage of the difference in linear contraction between metals with dissimilar coefficients of thermal expansion, the invention is not limited to aluminum and steel elements. Any two metals with the required characteristics may be chosen. For example, stainless steel and copper, or Phosphor bronze and aluminum, might be used in place of aluminum and steel.

Furthermore, the bellows could have been on the steel element and the aluminum member fashioned as an insert. Many combinations of metals and many configurations utilizing these principles are immediately suggested to one skilled in the art by this disclosure.

It is to be understood that the above described embodiment is illustrative of the principles of the invention. Numerous other embodiments using widely different materials or the same materials may be devised by those skilled in the art without departing from the spirit and scope of the invention.

What is claimed is:
1. A reusable coupling comprising:
   outer and inner generally cylindrical concentric hollow members of different coefficients of thermal expansion;
   the outer member of comparatively softer metal forming a bellows-like resilient sheath enclosing said inner member and terminating at one end in a surface transverse to its cylindrical axis;
   the inner member of comparatively harder metal terminating in a rim for sealingly engaging said surface; and
   adjustable clamping means bearing against both the other end of said sheath and said inner member, on the other side of said resilient sheath, for forcing said rim against said surface and preventing relative rotation of said inner and outer members, to form a seal between said members from ambient to cryogenic temperatures.

2. A coupling comprising:
   first and second axially aligned generally cylindrical members;
   the first of said members being of a relatively soft metal having an inner annular surface extending generally perpendicular to the axis of said members, having a bellows shaped sheath extending axially from said annular surface to terminate in a flange, and having a relatively high coefficient of expansion;
   the second of said members being of a relatively hard metal having an annular rim directly facing the surface of the first member and in contact with it to provide the seal directly between the two members, having an annular shoulder at a point just slightly further from said rim than the distance between the annular surface and the flange and the flange of the first member, and having a relatively low coefficient of expansion in comparison with said first member;
   means for applying a clamping force between the shoulder of the second member of hard material and the flange of said first member to provide sealing pressure between the sealing surfaces; and
   adjustable gap means for accurately setting the pressure on the seal surface and rim to cause plastic flow at the seal and for preventing the pressure from exceeding a value which will cause permanent deformation of other portions of the members at cryogenic temperatures.

3. A coupling comprising:
   first and second axially aligned generally cylindrical members;
   the first of said members being of relatively soft metal and having an annular surface extending generally perpendicular to the axis of said members;
   the second of said members being of a relatively hard metal having an annular rim directly facing the surface of the first member and in contact with it to provide a seal between the two members;
   one of said members having a bellows shaped sheath extending axially from said seal to terminate in a flange;
   the other of said members having an annular shoulder at a point slightly further from said seal than the distance between the seal and the flange of the first member;
   means for applying a clamping force between the shoulder of the second member and the flange of the first member to provide sealing pressure between the seal surface and rim;
   said two members having widely different coefficients of thermal expansion; and means for accurately setting the pressure on the seal surface and rim to cause plastic flow at the seal and for preventing the pressure from exceeding a value which will cause permanent deformation of other portions of the members at cryogenic temperatures.

4. A coupling comprising:
first and second axially aligned generally cylindrical members having different coefficients of thermal expansion;
the first of said members being of aluminum and having an inner annular surface extending generally perpendicular to the axis of said members and having a bellows shaped sheath extending from said annular surface axially to terminate in a flange;
the second of said members being of steel and having an annular rim directly facing the surface of the first member to provide the seal directly between the two members and having an annular shoulder at a point just slightly further from the rim than the distance between the aluminum surface and the aluminum flange at the end of the bellows;
threaded bolt means for applying clamping force between the aluminum flange and the steel shoulder to provide sealing pressure between the sealing surfaces; and
adjustable gap means for accurately setting the pressure on the seal surface and rim to cause plastic flow at the seal and for preventing the pressure from exceeding a value which will cause permanent deformation of other portions of the members at cryogenic temperatures.

5. A reusable coupling comprising:
outer and inner generally cylindrical concentric hollow telescoping members of different coefficients of thermal expansion;
one of said members being of comparatively harder metal and terminating at one end in a rim which extends transverse to its cylindrical axis;
the other member being of comparatively softer metal terminating in a surface for sealingly engaging said rim;
means including a bellows like resilient component forming part of one of said members for reducing the change in pressure applied across said surface and said rim with changes in temperature as a result of the differential thermal coefficients of expansion; and
adjustable clamping means engaging said members on the other side of said resilient component from said rim and said surface, for forcing said rim against said surface and preventing relative rotation of said members, to form a seal between said members from ambient to cryogenic temperatures.

6. A reusable coupling comprising:
outer and inner generally cylindrical concentric hollow telescoping members of different coefficients of thermal expansion;
one of said members being of comparatively harder metal and terminating at one end in a rim which extends transverse to its cylindrical axis;
the other member being of comparatively softer metal terminating in a surface for sealingly engaging said rim;
means including a resilient metallic component forming an integral part of one of said members for reducing the change in pressure applied across said surface and said rim with changes in temperature as a result of the differential thermal coefficients of expansion, and for maintaining substantially constant force for sealing engagement around said surface and said rim; and
adjustable clamping means engaging said members on the other side of said resilient metallic component from said rim and said surface, for forcing said rim against said surface and preventing relative rotation of said inner and outer members, to form a seal between said members from ambient to cryogenic temperatures.

References Cited by the Examiner

UNITED STATES PATENTS

| | | | |
|---|---|---|---|
| 2,407,745 | 9/1946 | Jacobson | 285—226 X |
| 2,546,332 | 3/1951 | Costello | 85—62 |
| 2,824,481 | 2/1958 | Johnson | 85—62 |
| 2,900,199 | 8/1959 | Logan | 285—187 |
| 3,088,758 | 5/1963 | Chilton | 285—187 |

FOREIGN PATENTS

| | | |
|---|---|---|
| 811,060 | 8/1951 | Germany. |
| 1,027,019 | 3/1958 | Germany. |
| 567,159 | 1/1945 | Great Britain. |
| 890,061 | 2/1962 | Great Britain. |

OTHER REFERENCES

"Temperature-Energized Static Seal for Liquid Hydrogen," by S. E. Logan, Advances in Cryogenic Engineering, volume 7, pages 556–561.

"Static Seals for Low Temperature Fluids," by Stanley E. Logan, Journal of the American Rocket Society, July 1955, pages 334–340.

CARL W. TOMLIN, *Primary Examiner.*

THOMAS F. CALLAGHAN, *Examiner.*